United States Patent [19]
Kuo et al.

[11] Patent Number: 5,481,930
[45] Date of Patent: Jan. 9, 1996

[54] PROBE GUIDE ASSEMBLY FOR A REACTOR COOLANT PUMP MOTOR

[75] Inventors: Hsiang-Jung Kuo; David A. Mohr, both of Trafford; Richard E. Salnick, Monroeville, all of Pa.

[73] Assignee: Westinghouse Electric Corporation, Pittsburgh, Pa.

[21] Appl. No.: 182,914

[22] Filed: Jan. 19, 1994

[51] Int. Cl.$^6$ .......................... G01M 19/00; G01N 21/88; G21C 17/01
[52] U.S. Cl. .......................... 73/866.5; 356/237; 376/248; 376/249; 73/116
[58] Field of Search .................................. 73/866.5, 116, 73/168; 376/245, 248, 249; 976/DIG. 207, DIG. 212; 356/237, 241, 240

[56] References Cited

U.S. PATENT DOCUMENTS

| | | | |
|---|---|---|---|
| 3,369,101 | 2/1968 | DiCurcio | 356/237 X |
| 4,302,772 | 11/1981 | Gillot | 376/248 X |
| 5,195,392 | 3/1993 | Moore et al. | 73/866.5 |

FOREIGN PATENT DOCUMENTS

| | | | |
|---|---|---|---|
| 3610458 | 12/1986 | Germany | 73/866.5 |
| 187141 | 8/1988 | Japan | 356/241 |
| 699378 | 11/1979 | U.S.S.R. | 73/866.5 |
| 1027601 | 7/1983 | U.S.S.R. | 73/866.5 |
| 1559185 | 1/1980 | United Kingdom | 356/241 |

*Primary Examiner*—Thomas P. Noland

[57] ABSTRACT

A probe guide assembly permits optical inspection of critical nuclear reactor coolant pump motor parts located inside a generally cylindrical motor housing without requiring disassembly of the motor. The assembly is removably mounted to the outside of the housing near a vent and includes a probe guide member for carrying an elongated probe guide that extends into the housing through the vent. The probe guide member is mounted to a cross bar that spans the vent in a first direction. The probe guide member can be moved to a selected position in the first direction along a slot in the cross bar and can rotate in the slot so as to angularly position an end of the probe guide interior the housing. The cross bar is adjustably positioned in a second direction across the vent by fastening the ends of the cross bar to different points along a pair of mounting bars extending in the second direction on opposite sides of the vent.

21 Claims, 4 Drawing Sheets

1

PROBE GUIDE ASSEMBLY FOR A REACTOR COOLANT PUMP MOTOR

BACKGROUND OF THE INVENTION

1. Field of the Invention

This invention relates to tools for inspecting reactor coolant pump motors, and, in particular, a probe guide assembly for adjustably positioning an elongated probe guide extending through a vent in the reactor coolant pump motor housing.

2. Description of the Prior Art

Reactor coolant pumps are generally used for circulating coolant water for nuclear reactors. A typical pump includes a 7,000 Hp, 1,200 rpm, 6600 V motor having a high degree of cylindrical symmetry about an axially extending coolant water conduit. The motors must be inspected for abnormal condition or material degradation about every five years, and repairs undertaken if necessary. The rotor parts that need to be inspected include the shrink rings, the resistance rings, the rotor bars, the brazed joints between the resistance rings and the rotor bars, and the end pack of the rotor punching. Stator parts needing inspection include the coils and the Dacron® pads.

Typically, the inspection involves disassembling the motor. This requires that the motor be taken out of service and removed from the coolant system, thus involving an extended shut down of the nuclear reactor. The current method of inspection is performed at significant cost in time, labor and equipment. A polar crane is needed to lift the reactor coolant pump motor out of position in the reactor coolant system. A significant lay-down space is needed to perform the disassembly and inspection. There is a high labor cost in removing, disassembling, reassembling and reinstalling the reactor coolant pump motor. The plant personnel working on the reactor coolant pump motor disassembly, inspection and reassembly can be exposed to radiation, thus bringing in health physics costs. Many seals and other parts must be replaced when the reactor coolant pump motor is reassembled and reinstalled in the reactor coolant system, further adding to the cost. There is also the risk of damage to the reactor coolant pump in the process of removal, disassembly, reassembly and reinstallation.

Therefore, there is a need for a system for inspecting the reactor coolant pump motor without requiring its removal from the reactor system and disassembly.

SUMMARY OF THE INVENTION

According to the present invention, a probe guide assembly permits remote visual inspection of critical reactor coolant pump motor parts located inside the motor housing. An optic probe is positioned by the probe guide assembly in the interior of the motor housing. The probe guide assembly is mounted to an outer surface of the generally cylindrical motor housing in front of a vent. The probe guide assembly is used to adjustably position an elongated probe guide, carrying the optic probe, that extends through the vent into the housing. The assembly includes a mounting arrangement, or frame, removably attached to the outer surface of the motor housing near the vent. An elongated cross bar is attached to the mounting assembly such that it about spans the vent in a first direction. The attachment mechanism of the cross bar to the mounting assembly allows adjustable positioning of the cross bar in a second direction about orthogonal to the first direction. A probe guide member is attached to the cross bar with a mechanism that permits its position in front of the vent to be adjusted along the length the cross bar. The probe guide member carries the probe guide, and thus the positioning of the probe guide can be adjusted in two about orthogonal directions by adjusting the position of the probe guide member and adjusting the position of the cross bar. The probe guide member can also be pivoted about its point of attachment to the cross bar to further angularly position the probe guide within the housing.

The mounting arrangement preferably includes a pair of elongated mounting bars extending about in parallel on either side of the vent in an about axial direction defined by the housing. The cross bar is attached to the mounting bars to form an H-shaped frame wherein the position of the cross bar can be raised or lowered in the second direction to a selected position.

According to another aspect of the invention, the mechanism for attaching the probe guide member to the cross bar includes a slot in the cross bar, preferably arcuate, that about spans the vent. The probe guide member is adapted to be able to slide in the slot and then be fastened at a preselected position. Preferably, a bolt having a threaded stem extending through the slot is used for the body of the probe guide member. The bolt can be fastened at a selected position with a mating nut screwed onto the threaded end of the stem. Rotation of the bolt within the slot will angularly rotate a probe guide attached to the bolt for further positioning within the housing.

According to another aspect of the invention, the probe guide is a tubular member attached to the probe guide member with a tube fitting. An optic probe, for example, a bundle of optic fibers can then be fed through the tube member for visual inspection of the motor parts inside the housing.

According to another aspect of the invention, the frame, or the pair of mounting bars, is attached to the motor housing by magnets located in slots of the frame. Axial positioning of the cross bar can be obtained by repositioning the frame, or mounting bars, on the housing surface by gently pushing up or down on the frame or the mounting bars.

According to another aspect of the invention, a mechanism for attaching the cross bar to the mounting bars includes a plurality of axially spaced holes that are preferably tapped in each mounting bar. The cross bar includes a pair of end holes, one located near each of its distal ends. The cross bar is axially positioned by aligning the holes in the cross bar with a selected pair of the axially spaced holes in the mounting bars, and then using fasteners that maintain the alignment, preferably threaded bolts, to fasten the cross bar at the selected position.

According to another aspect of the invention, the end holes in the cross bar are longitudinal slots that permits the cross bar to be attached to mounting bars having a range of spacing. This feature allows attachment of the apparatus in front of vents of varying sizes.

It is an object of this invention to provide an apparatus for inspecting a reactor coolant pump motor without requiring that the reactor coolant pump be removed from the reactor coolant system.

It is another object of this invention to provide an apparatus for inspecting a reactor coolant pump motor without requiring the motor to be disassembled for inspection.

It is another object of this invention to provide an apparatus for on site visual inspection of reactor coolant pump motor parts, such as shrink rings, resistance rings, rotor bars, brazed joints between resistance rings and rotor bars, end packs of rotor punchings, coils and dacron pads.

It is another object of this invention to provide an apparatus for inspection of reactor coolant pump motors that reduces the health physics cost of inspecting the motor and health risk to plant personnel by reducing the exposure time of plant personnel to radiation.

It is another object to provide an apparatus for inspection of reactor coolant pump motors that reduces the time and labor cost of inspection.

It is another object of this invention to provide an apparatus for inspection of reactor coolant pump motors that reduces the parts cost of inspection.

It is another object of this invention to provide an apparatus for inspection of reactor coolant pump motors that reduces the need or use of a polar crane in the inspection.

It is anther object of this invention to provide an apparatus for inspection of reactor coolant pump motors that reduces the required lay-down space for the inspection.

It is another object of this invention to provide an apparatus for inspection of reactor coolant pump motors that reduces the risk of damage to the pump and motor during inspection.

These and other objects of the present invention will be more fully understood from the following description of the invention with reference to the illustrations amended hereto.

DETAILED DESCRIPTION OF THE INVENTION

Figure 1:
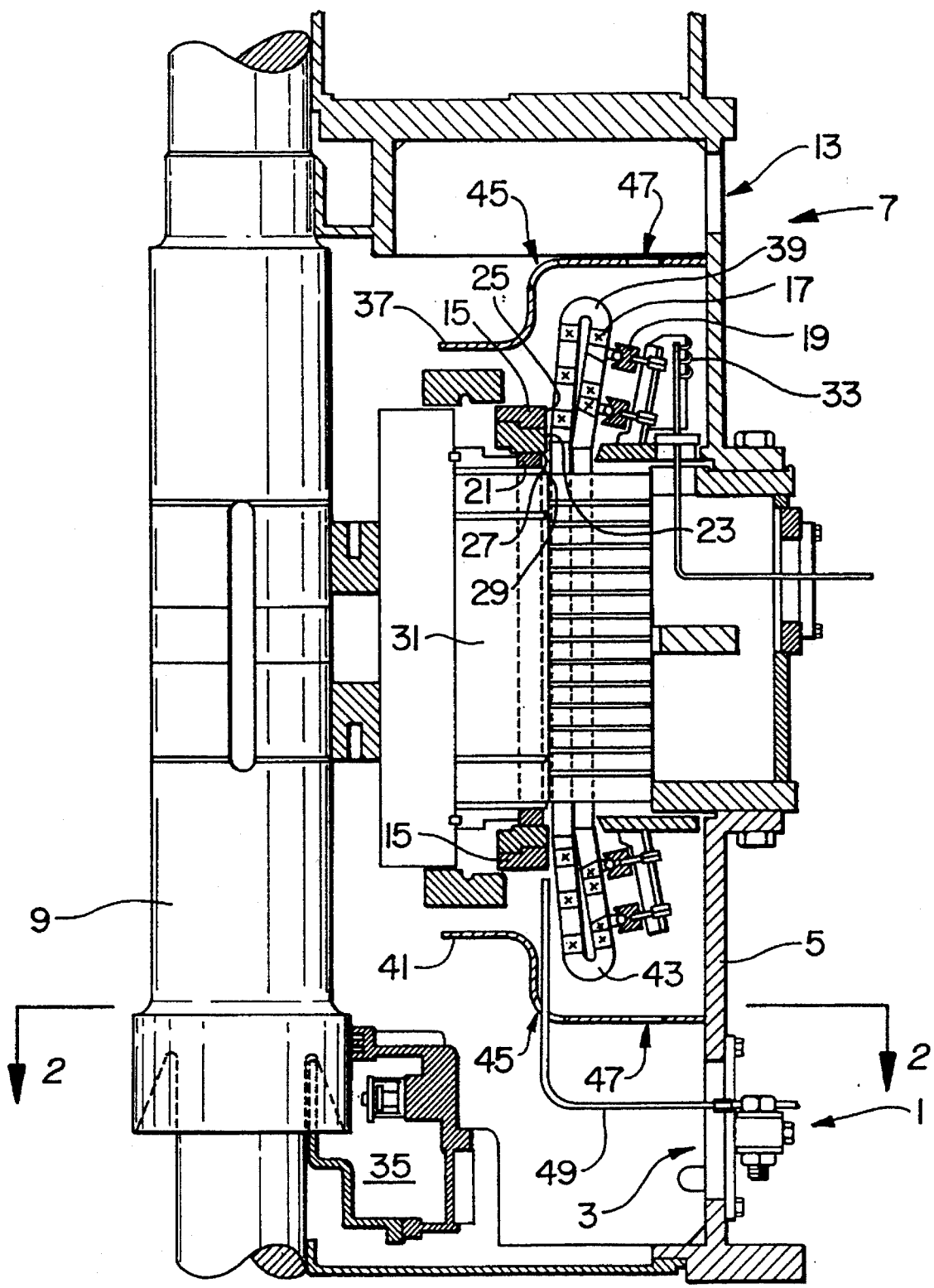
FIG. 1 is a longitudinal section of a typical reactor coolant pump motor from the drive shaft to the housing with the probe guide assembly of this invention attached to the motor housing.

Referring now to the drawings, FIG. 1 illustrates a typical placement of the probe guide assembly 1 of this invention at a vent 3 in the motor housing 5 for a reactor coolant pump motor 7. The pump motor 7, which has a high degree of cylindrical symmetry about an axial drive shaft 9, typically has a plurality of angularly spaced upper vent openings 13 and lower vent openings 3 in the housing 5. Between the upper vent openings 13 and the lower vent openings 3 and within the interior the the housing 5 are several motor components that require periodic inspection. Among these are rotor end rings 15, stator coils 17, support rings 19, rotor bars 21, resistance rings 23, shrink rings 25, braze joints 27 between the resistance rings 23 and the rotor bars 21, end packs 29 of rotor punchings 31 (laminations) and parallel rings 33. The motor 7 also includes bearing mechanisms 35 for the drive shaft 9, one of which is located at about the axial position of the lower vent openings 3 and the other of which is located above the upper vent openings 13. An S-shaped upper air shield 37 is located between the upper stator coil end turns 39 and the upper vent openings 13, and an S-shaped lower air shield 41 is located between the lower vent openings 3 and the lower stator coil end turns 43.

Figure 2:
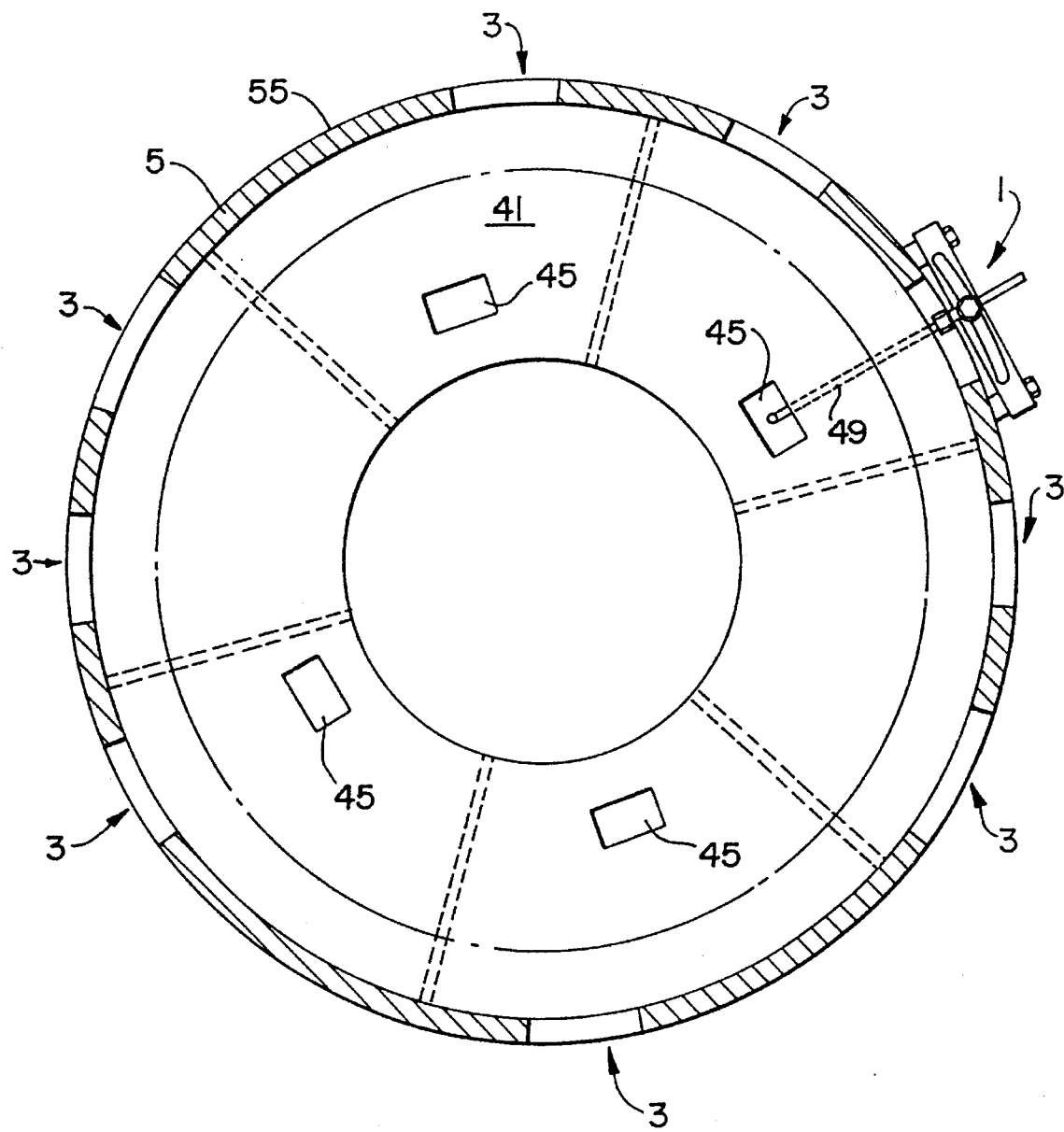
FIG. 2 is a cross section through line 2—2 of FIG. 1.

FIG. 2 illustrates that there are four viewing openings, or slots 45, in the lower air shield 41 spaced at a first radius. Each is at a location of an existing hole that has been widened, and each is also located generally radially inward from an existing vent. There are also a plurality of angularly spaced viewing holes 47 in the lower air shield 41 at a second, larger radius. (see FIG. 1) Similar viewing holes 45, 47 are located in the upper air shield.

A probe guide assembly 1, according to the present invention, is removably positioned in front of one of the lower vents 3. A tubular probe guide 49 having a bend and carried by the probe guide assembly 1 is inserted through the vent 3 and through one of the openings 45 in the lower air shield 41. A video probe (not shown) is inserted in the probe guide tube to view the motor components for inspection.

Figure 3:
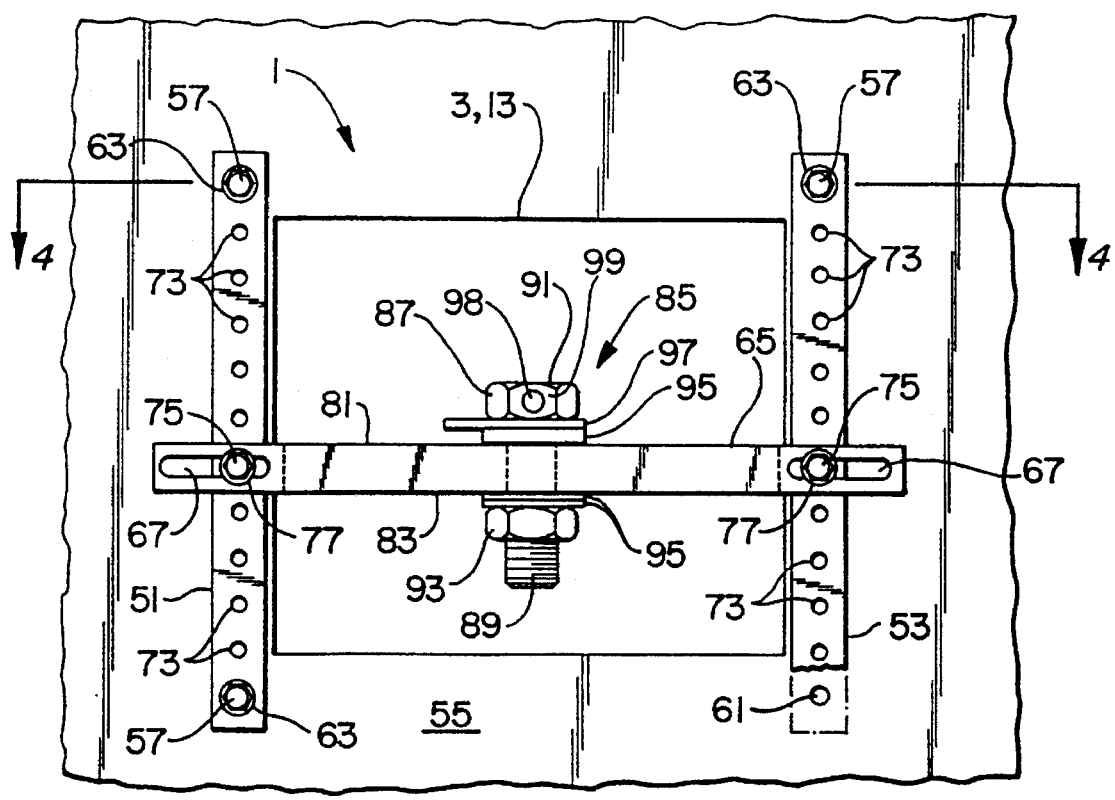
FIG. 3 is an elevation view of an embodiment of this invention showing a preferred arrangement for axial adjustment of the probe guide assembly.
Figure 4:
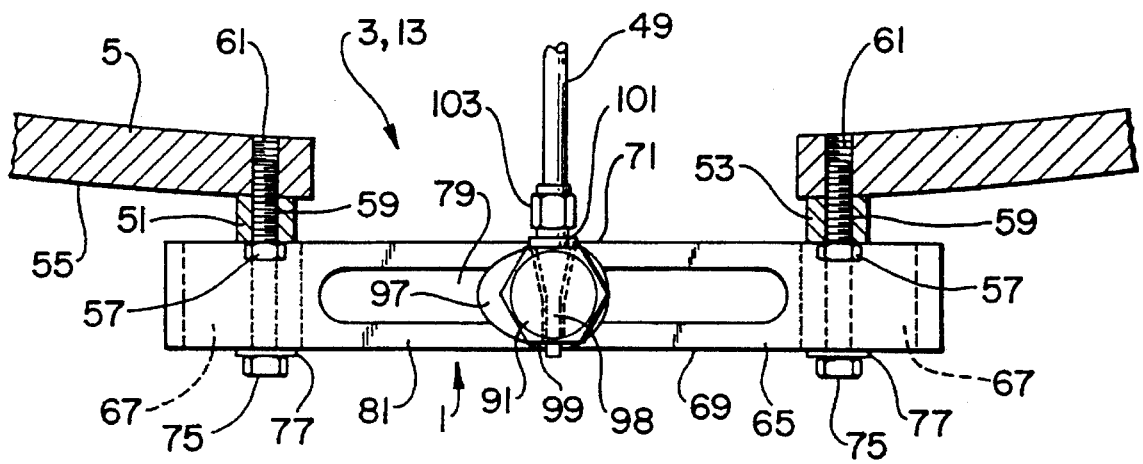
FIG. 4 is a sectional view through line 4—4 in FIG. 3.

Referring now to FIGS. 3 and 4, a preferred embodiment of this invention includes a pair of elongated mounting bars 51 and 53 removably attached to the exterior surface 55 of the motor housing 5 on either side of a generally rectangular vent 3, 13. As illustrated, the mounting bars 51, 53 are oriented about parallel to the central axis of the motor housing 5. Fasteners, such as threaded bolts 57 extending through mounting bar holes 59 located near the ends of the mounting bars 51, 53 are threaded into mating tapped holes 61 in the motor housing 5. Washers 63 can be used if desired.

Removably attached to each of the vents 3, 13 is an elongated cross bar 65 that spans the vent 3, 13 in a direction about orthogonal to the orientation of the mounting bars 51, 53. The cross bar 65 has a pair of longitudinal end holes, or slots 67, extending between radially spaced sides 69, 71 of the cross bar 65 near each of the ends. These slots 67 are aligned with a selected pair of cross bar positioning holes 73 in the mounting bars 51, 53 at a selected axial position. The cross bar positioning holes 73 in each of the mounting bars 51, 53 are longitudinally spaced. The cross bar 65 is then fastened at the selected axial position to the pair of selected cross bar positioning holes 73 by a pair of fasteners, such as threaded bolts 75. The axially spaced apart cross bar positioning holes 73 in the mounting bars 51, 53 can be tapped holes for receiving the threaded bolts 75 as illustrated in the drawing, or, alternatively, they can be through holes and the bolts then fastened by mating nuts (not shown). A different axial position for the cross bar 65 is obtained by fastening the cross bar to a different pair of cross bar positioning holes 73 at a different axial position. Washers 77 may also be used with these bolts 75, if desired.

The cross bar 65 has a larger slot 79 that about spans the vent 3, 13. In this embodiment, the slot 79 extends between axially spaced sides 81 and 83 of the cross bar 65. A probe guide member 85 is fastened in a selected position in the slot. The probe guide member 85 preferably includes a large bolt 87 having a threaded stem 89 extending through the slot 79, a hex head 91 on a first one of the axially spaced sides 81 and a nut 93 threaded onto the stem 89 on the other of the axially spaced sides 83. Round washers 95 and pant leg washers 97 may be used if desired in securing the bolt 87. The bolt head 91 has a hole 98 drilled through two spaced, parallel faces 99 and 101 and a tube fitting 103 is fastened to one end of the hole 98. The probe guide 49 is removably fastened to the tube fitting 103.

Figure 5:
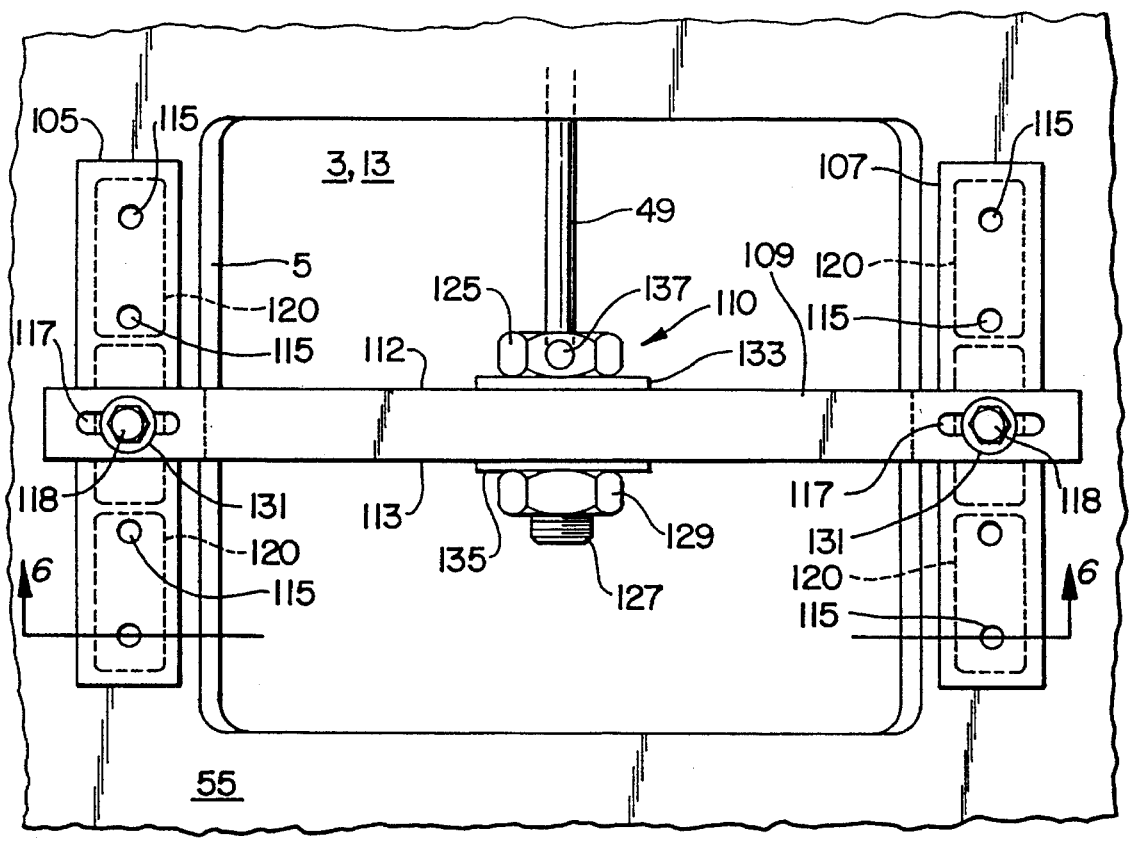
FIG. 5 is an elevation view of an embodiment of the probe guide assembly of this invention different from that illustrated in FIGS. 3 and 4.
Figure 6:
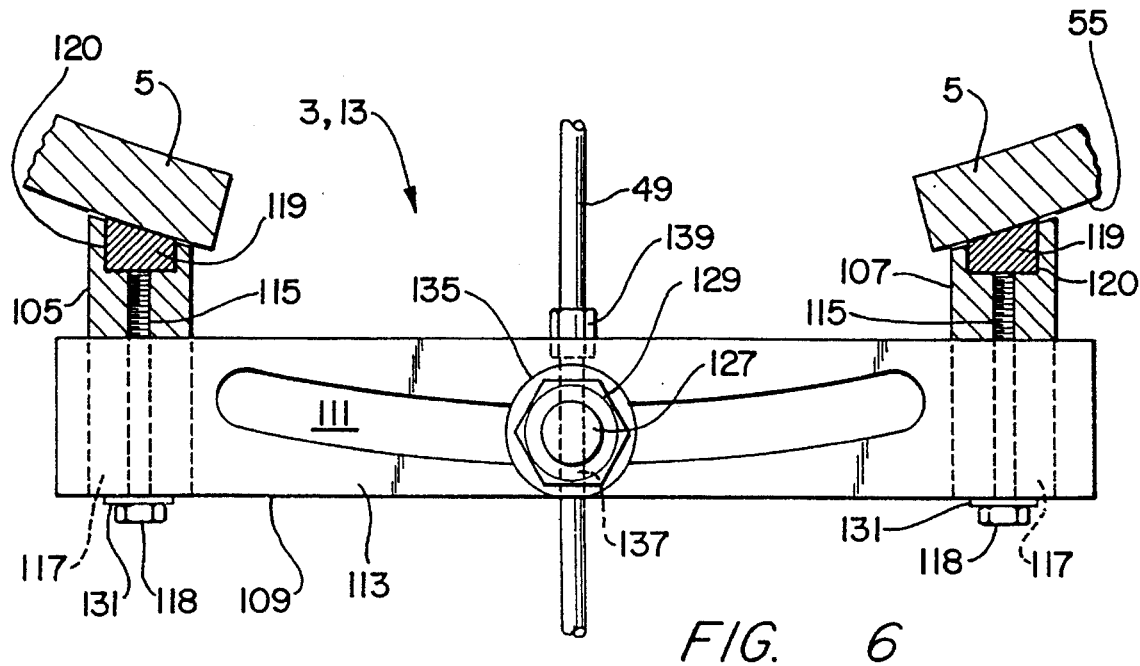
FIG. 6 is a sectional view through line 6—6 of FIG. 5.

A second preferred embodiment is illustrated in FIGS. 5 and 6. As in the first preferred embodiment described above, the probe guide assembly 1 includes a pair of axially oriented mounting bars 105 and 107 spaced apart on either side of a vent 3, 13. A cross bar 109 is removably attached to the mounting bars 105, 107 and a probe guide member 110 is adjustably fastened to a large slot 111 in the cross bar 109 that extends about across the vent 3, 13 between axially spaced sides 112 and 113 thereof. The mounting bars 105, 107 each include a plurality of axially spaced, tapped, cross bar positioning holes 115. The cross bar 109 is axially positioned such that each of a pair of end slots 117 in the cross bar is aligned with a pair of the cross bar positioning holes 115. Fasteners, such as the threaded bolts 118 mating with the tapped cross bar positioning holes 115, are used to secure the cross bar 109 to the mounting bars at the selected axial position. The large slot 111 in the cross bar 109 is arcuate, having a radius of curvature centered on the central axis of the motor housing 5. The mounting bars 105, 107 are attached to the exterior surface 55 of the motor housing 7 by magnetic members. The magnetic members can be magnets 119 located in slots 120 in the mounting bars, which are permeable. The magnetic members 119 are shaped on a side to fit the exterior surface 55 of the permeable housing 5. The probe guide member 110 in this case is also a hex bolt 125 having a threaded stem 127 and attached to the arcuate slot 1111 by a nut 129 mating with the threaded stem 127. Washers 131, 133 and 135 can be used if desired for attachment of the bolts 118 and 125. The probe guide member 110 additionally includes a through hole 137 and a tube fitting 139 for insertion of the optical probe (not shown) and attachment of the probe guide 49, respectively.

It will be understood by those skilled in the art that the probe guide assembly 1 of this invention can be used on vents of varying sizes because of the flexibility of the end slots 67, 137 on the cross bar 65, 109. This enables the spacing of the mounting bars 51, 53 and 105, 107 to be varied within a flexible range to accommodate vents of different opening sizes.

It will also be appreciated that because the probe guide member 85, 110 preferably includes a bolt 87, 125 that can be rotated within the large slot 79, 111, the probe guide 49 can be positioned at various selected angles within the housing 5 to reach holes in the air shield that are not directly on a radius to a vent opening.

It will further be appreciated that a large slot in the cross bar can extend between radially spaced sides of the cross bar. In this embodiment (not shown), the probe guide member can also include a bolt. However, the video probe can be fed through a hole extending longitudinally through the bolt instead of across the bolt head. This permits the probe guide to be rotated about the axis of the bolt.

It will also be appreciated that a tube fitting can be mounted on top of the bolt head of the probe guide member without requiring a hole drilled through the bolt head.

In addition, it is not required that a pair of elongated, parallel mounting bars be used for attachment to the housing and mounting the cross bar. A single mounting member, such as an elongated member, a rectangular, concave member, or a variety of other shapes, may also be used.

Whereas particular embodiments of the precedent invention have been described for purposes of illustration, it will be appreciated by those skilled in the art that numerous variations of the details may be made without departing from the invention as described in the appended claims.

We claim:

1. An adjustable probe guide assembly for removable attachment to an outer surface of a motor housing defining a vent, the probe guide assembly comprising:

mounting means for removable attachment to the outer surface near the vent;

an elongated cross bar adjustably fastened to the mounting means and almost spanning the vent in a first direction outside the vent;

cross bar positioning means for adjustably positioning the cross bar substantially across the vent in a second direction about orthogonal to the first direction;

a probe guide member attached to the cross bar including means for attaching an elongated probe guide extending through the vent into the interior of the housing; and probe guide member positioning means for fastening the probe guide member at a selected position on the cross bar that is adjustable in a direction that is substantially parallel to the first direction, wherein the position of the probe guide member can be adjusted substantially transverse to the probe guide for adjustably positioning the probe guide within the housing.

2. The probe guide assembly of claim 1, wherein the probe guide member positioning means is further for adjustably positioning a distal end of the probe guide interior the housing while the probe guide member is positioned at a selected fixed location.

3. The probe guide assembly of claim 2, wherein the mounting means includes first and second elongated mounting bars extending approximately in the second direction and mounting bar attachment means for removably attaching the mounting bars to the outer surface in substantially parallel spaced relation on opposite sides of the vent, and wherein the cross bar is adjustably fastened to each of the mounting bars.

4. The probe guide assembly of claim 3, wherein the probe guide member positioning means includes a cross bar slot in the cross bar elongated in approximately the first direction and almost spanning the vent.

5. The probe guide assembly of claim 4, wherein the probe guide member includes a bolt having a threaded stem extending through the cross bar slot, and a nut mating with the threaded stem for removably fastening the bolt to the cross bar.

6. The probe guide assembly of claim 5, wherein a central axis of the bolt is oriented substantially parallel to the outer surface.

7. The probe guide assembly of claim 6, wherein the cross bar slot is an arcuate slot with a radius of curvature approximately centered on an axis defined by the motor housing.

8. The probe guide assembly of claim 7, wherein the means for attaching the elongated probe guide includes a tube fitting attached to the bolt.

9. The probe guide assembly of claim 5, wherein the cross bar positioning means includes a plurality of parallel extending cross bar positioning holes in each of the mounting bars spaced apart in the second direction, a pair of spaced apart, parallel extending, end slots in the cross bar located near the ends thereof, and a pair of cross bar fastening means for removably fastening the cross bar to the mounting bars such that the pair of end slots are aligned with a selected pair of the cross bar positioning holes, and wherein the end slots extend approximately in the first direction for adjusting the separation of the mounting bars in the first direction.

10. The probe guide assembly of claim 9, wherein the mounting bar attachment means includes magnetic means for magnetically fastening each of the mounting bars to the outer surface of the housing.

11. The probe guide assembly of claim 9, wherein the mounting bar attachment means includes, for each mounting bar, a threaded fastener extending through a mounting bar mounting hole in each mounting bar for screwing into a mating tapped hole in the motor housing.

12. A probe guide assembly, comprising:

an elongated probe guide;

a probe guide carrier including probe guide fastening means for attachment of the probe guide; and first positioning means for positioning the probe guide carrier at a selected position outside a vent of a generally cylindrical motor housing such that the probe guide extends into the interior of the housing through the vent, wherein the position of the probe guide carrier can be adjusted substantially transverse to the probe guide for adjustably positioning the probe guide within the housing.

13. The probe guide assembly of claim 12, wherein the first positioning means includes angle means for orienting the probe guide at a selected angle from a radius of the housing.

14. The probe guide assembly of claim 13, wherein the first positioning means further includes a frame, comprising:

frame mounting means for demountably attaching the frame to an outer surface of the housing near the vent;

an elongated cross bar almost spanning the vent in a first direction, comprising probe guide carrier mounting means for attaching the probe guide carrier at a first selected position on the cross bar that is adjustable in the first direction; and cross bar mounting means attached to the frame mounting means for adjustably positioning the cross bar at a second selected position that is adjustable in a second direction approximately orthogonal to the first direction.

15. The probe guide assembly of claim 14, wherein the cross bar mounting means includes first and second elongated mounting bars extending approximately in about the second direction in substantially parallel spaced relation in opposite sides of the vent, and wherein the cross bar is adapted for adjustably fastening at ends thereof to each of the mounting bars at the second selected position.

16. The probe guide assembly of claim 15, wherein the probe guide carrier mounting means includes a longitudinal slot in the cross bar, and wherein the probe guide carrier includes an elongated probe guide carrier member extending through the slot and probe guide carrier member fastening means for adjustably fastening the probe guide carrier member to the cross bar at the first selected position in the the slot.

17. The probe guide assembly of claim 16, wherein the angle means is characterized in that the probe guide carrier member is capable of being rotated about a central longitudinal axis thereof in the slot for orienting the probe guide at the selected angle before being fastened to the cross bar by the probe guide carrier member fastening means.

18. A probe guide assembly for removably mounting to an outer surface of a generally cylindrical motor housing defining orthogonal axial, radial and angular directions, comprising:

an elongated, tubular, probe guide extending through a vent in the housing, including an end interior the housing for carrying an optical probe;

a probe guide carrier adjustably positioned outside the housing in front of the vent, including a bolt having a head and a threaded stem, and probe guide fastening means at the head for attachment of the probe guide;

an elongated cross bar spanning the vent outside the housing, including a slot extending longitudinally about across the vent and extending through the cross bar between axially spaced sides thereof, and a pair of longitudinal end slots extending through the cross bar between radially spaced sides near ends thereof, wherein the threaded stem extends through the slot and the probe guide carrier is adjustably fastened to the cross bar at a selected angular position by a nut screwed onto the threaded stem;

a pair of about axially extending mounting bars on angularly spaced sides of the vent, each including a cross bar positioning hole aligned with one of the end slots, and mounting bar attachment means for removably attaching the mounting bars to the outer surface of the housing; and a pair of cross bar fastening means for attaching the cross bar to the pair of mounting bars, each including a cross bar fastening means stem extending through one of the end slots and the cross bar positioning hole in one of the pair of mounting bars.

19. The probe guide assembly of claim 18, wherein each of the mounting bars includes a like plurality of cross bar positioning holes spaced apart in the axial direction.

20. The probe guide assembly of claim 19, wherein the mounting bar attachment means includes, for each mounting bar, a magnet magnetically attaching the mounting bar to the housing.

21. The probe guide assembly of claim 18, wherein the slot is an arcuate slot having a radius of curvature approximately centered on a central housing axis and extending substantially in the angular direction.

* * * * *